United States Patent
Andrews, Jr.

[11] 3,766,307
[45] Oct. 16, 1973

[54] BUOYANT ELECTRICAL CABLES

[76] Inventor: Daniel E. Andrews, Jr., San Diego, Calif.

[22] Filed: Aug. 25, 1972

[21] Appl. No.: 284,009

[52] U.S. Cl. .................. 174/47, 174/36, 174/70 R, 174/101.5, 174/115, 174/116
[51] Int. Cl. ............................................. H01b 7/12
[58] Field of Search ............... 174/36, 47, 70 R, 174/115, 101.5, 116

[56] References Cited
UNITED STATES PATENTS

| | | | |
|---|---|---|---|
| 3,272,910 | 9/1966 | Flint | 174/101.5 |
| 3,304,364 | 2/1967 | Hetherington | 174/101.5 |
| 3,517,110 | 6/1970 | Morgan | 174/101.5 X |
| 3,549,788 | 12/1970 | Apen | 174/115 |
| 3,660,590 | 5/1972 | Conant | 174/47 |

OTHER PUBLICATIONS
Electronic Design Vol. 11, No. 16, Aug. 2, 1963–Simplex Electronic Cables–P. 25.

*Primary Examiner*—E. A. Goldberg
*Attorney*—Richard S. Sciascia et al.

[57] ABSTRACT

A cable for marine applications includes a series of discrete noncollapsible or rigid buoyant members carried inside a sheath which serves to hydrodynamically streamline the cable as well as providing electrical insulation. The cable in addition to containing electrical conductors does contain other elements such as fiber optics, hydraulic liners and wire or glass ropes. Furthermore, the buoyancy elements are sized to ensure neutral buoyancy and are formed to be relatively noncollapsible to provide the neutrally buoyant capability irrespective of changing ambient pressures.

19 Claims, 12 Drawing Figures

Patented Oct. 16, 1973  3,766,307

Patented Oct. 16, 1973  3,766,307

BUOYANT ELECTRICAL CABLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Cables containing electrical conductors adapted for marine use are many and varied in design. Cables suitably waterproofed and containing buoyant sections routinely are employed and nearly all these cables have teken advantage of the water's buoying effect to lessen the cables' tensile strength requirements. Usually, the end result takes the form of a floating cable floating on the water's surface. However, in most situations where these floating cables have been used, their vulnerability requires that ships be barred from passage through their vicinity. Additionally, a floating cable is not desirable where the cable's location should remain unknown from unfriendly eyes. Attempts to utilize the older techniques employed in the design of floating cables for the construction of neutrally buoyant ones to be used beneath the surface of the water have largely proven to be unsatisfactory. The compliant compartments and flexible plastic foams internally carried for buoyancy purposes for floating cables do not adapt themselves for undersea use. As greater depths are encountered, the crushing pressure collapse the buoyant compartments. With the cable's buoyancy steadily diminishing, the cable's weight often causes, failure of either the cable or the associated system. The weight of an appreciable length of cable having collapsed flotation elements could, for example, spell disaster to a submersible tethered to a habitat by one of the "collapsible" cables. One noteworthy attempt to create a neutrally buoyant marine cable involved selecting a waterproof, negatively buoyant cable and externally affixing rigid, hollow floats along spaced intervals. The number of floats and their spacing is precalculated to provide a neutrally buoyant cable. The biggest drawback of this design becomes apparent as the cable is being played-out or retrieved. The floats, not lending themselves to storage on a drum, must be removed or attached in a time-consuming procedure as the cable is being recovered or deployed. One other approach worth mentioning here calls for weaving fabric strands about a bundle of electrical conductors and covering the weaved fabric with a waterproofing sheath. Interconnected spaces and voids are created in the interwoven fabric strands defining a continuous air sac for buoying the heavier electrical conductors and wire rope. The main shortcoming of this design is the creation of a single continuous air sac. When only one small point in its waterproof sheath becomes pierced by a foreign object, water leaks into the cable and floods the continuous air sac to destroy the cable's buoyancy throughout its length. In addition, if this design, or for that matter any of the aforedescribed designs, are towed through the water at a high speed or need to function as the towing cable, the longitudinal, tensile stresses created due to the towing further compress the buoyant spaces. A continuing need within the state of the art exists for a marine cable containing discrete buoyant sections and having a streamlined outer surface and flexibility for permitting the use of reels and its storage on a drum, as well as inherently possessing high-speed-towing strength characteristics.

SUMMARY OF THE INVENTION

A cable for marine application includes a means for providing continuous longitudinal strength having a flexibility to allow the use of reels and curved storage on a drum and additionally for providing electrical conductors hydraulic lines and fiber-optic bundles. A casing provides improved hydrodynamic characteristics and also contains a plurality of discrete longitudinally spaced buoyant sections sized for ensuring a predetermined buoyancy for neutrally buoying up the cable and fabricated for being relatively nondeformable by changing ambient pressures.

A prime object of the invention is to provide a neutrally buoyant cable for marine applications.

Another object is to provide a marine cable having a plurality of discrete buoyant sections relatively uneffected by ambient pressures.

Still another object of the invention is to provide a marine cable having a sufficient tensile strength to allow its use in high speed towing.

Yet another object is to provide a neutrally-buoyant marine cable having an outer surface with improved hydrodynamic characteristics.

A further object is to provide a marine cable having nondeformable buoyant sections rendering the cable neutrally buoyant irrespective of ambient pressure.

Still another object of the invention is to provide a marine cable fabricated to allow the use of reels and curved storage on a drum and being readily deployed and retrieved with no structural modification.

Another object is to provide a cable having otherwise deformable voids filled to retain the cable's predetermined buoyancy irrespective of changing pressures.

These and other objects of the invention will become more readily apparent from the ensuing specification when taken with the drawings.

BRIEF DESCRIPTION OF THE DRAWINGS

FIG. 4a' is an end view taken generally along lines 4a'—4a' in FIG. 4a.

FIG. 4a'' is a cross-sectional view of the type of buoyant-compartment end closures shown in FIG. 4a.

FIG. 4b' is an end view taken generally along lines 4b'—4b' in FIG. 4b.

FIG. 4b'' is a cross-sectional view of the other type buoyant-compartment end closure shown in FIG. 4b.

DESCRIPTION OF THE PREFERRED EMBODIMENT

Figure 1:
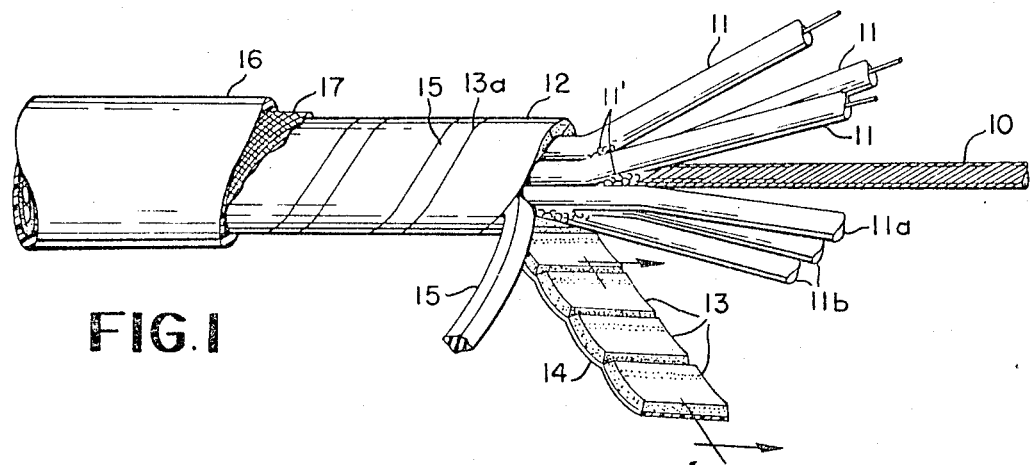
FIG. 1 is an isometric view shown partly in exploded section of one embodiment of the invention.
Figure 1A:
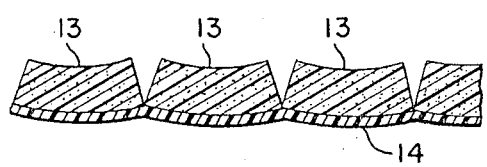
FIG. 1a shows a cross-sectional representation of the flotation strip generally taken along lines 1—1 in FIG. 1.

Referring now to the drawings, there are disclosed several embodiments of the invention each presenting a streamlined, hydrodynamically noise-free surface and including noncollapsible buoyant sections while possessing sufficient tensile strength characteristics. In the embodiment shown in FIG. 1, for example, a length of wire or fiber glass rope 10 axially runs the length of the neutrally buoyant cable and serves as the primary tensile load bearing member. A bundle of insulated electrical conductors 11, a bundle of fiber optics 11a, and a pair of hydraulic lines 11b and 11c are helically wrapped about the rope and function as bidirectional data links as well as supplying electrical and hydraulic power throughout the cable's length. Rope 10 and conductors 11 functionally cooperate to provide a means for providing a continuous tensile strength while simultaneously providing an electrical conductor. Any spaces or voids inadvertently created as these elements are assembled are filled with a plastic filler 11' to eliminate pressure collapsible spaces which would otherwise allow variation of the cable's buoyancy as a function of ambient pressures. Furthermore, this plastic filler is injected to fill all buoying spaces not intentionally designed or provided for during manufacture which may be created between other elements to be elaborated on below.

Any length of such a cable consisting only of the wire rope and conductors is heavy and would be suitable only where it is to lie on the bottom of a body of water. Certainly, this negatively buoyant design could not link a tethered vehicle to a command submersible. Particularly with respect to the embodiment thusly described, neutral buoyancy is created by the unique inclusion of a helically mounted flotation strip 12 along the longitudinal reaches of the cable. The flotation strip is made up of a series of juxtaposed flotation elements 13 each generally having the configuration of parallelogram-shaped arcuate section cut from a cylindrical shell. In this representative embodiment, the flotation elements were cut from a cylindrical tube of the material having the strength and buoyancy characteristic of the material commercially known as "Syntactic Foam" manufactured by 3-M Company of Minneapolis, Minnesota. The exact type of syntactic foam selected is governed by the stresses that the cable will be subjected to as well as the amount of buoyancy required per unit length of cable. Two suitable foams will be discussed below. An alternate method of forming the individual flotation elements is to cast them in a suitably-shaped mold having the proper cross-sectional configuration to achieve the same result.

Irrespective of which method of formation is chosen, the flotation elements are arranged to define a helical spiraling flotation strip having adjacent end portions separated by a similarly spiraling void 13a. The strip is fashioned by bonding adjacent flotation elements onto a flexible backing 14. Having the flotation elements bonded onto the backing prior to assembling the cable greatly simplifies the cable's final assembly process. The backing optionally is modifiable to waterproof the interior of the cable as well as serving as a support basis for shielding as will be elaborated on below.

Since syntactic foam is relatively brittle and not prone to excessive flexure, a compliant strip 15 is interposed in the void 13a located in the helically reaching flotation strip. The compliant strip is a rubber-like material preferably bonded in place as a part of the flotation strip and, because it has resilient compressive and elastic stretching properties, the composite cable possesses a flexibility to allow its storage on a drum or to responsively follow a remotely deployable device. The compliant strip is either bonded onto adjacent flotation elements or is bonded onto the flexible backing or a combination of both as the situation demands.

Further protection and final waterproofing of the cable is ensured by the inclusion of an outer sheath 16. Polyvinylchloride long has demonstrated its aptness for this purpose and is selected to provide a smooth, rugged outer surface which is resistant to routine abuse.

One of the immediately apparent benefits of the aforedescribed design is owed to the location of helically mounted flotation strip 12. The discrete flotation elements 13 collectively provide a continuous armor-like barrier to sharp objects which might penetrate sheath 16. Thus, the insulated electrical conductors, fiber optic bundle, and hydraulic ducts are less vulnerable to damage and the reliability of the cable is increased. Furthermore, because each flotation element is a discrete, separate unit, damage to one or a few does not impair the buoyancy capabilities of the other elements.

Optionally, the embodiment of FIG. 1 lends itself for further modification by the inclusion of a fine wire-mesh or foil layer 17 either inside of or outside of the flotation strip to provide shielding from spurious, remotely originating signals. When electrical conductors 11 each serve as conduits for low power signals, the problems associated with cross-talk between adjacent conductors are minimal. In such cases, only a single shielding 17 carried outside of the plurality of electrical conductors electrically isolates them all from the remotely originating spurious signals.

Having the cable arranged as disclosed allows a designer considerable latitude in determining the relative buoyancy of the cable. Information regarding the buoyancy per unit volume of the syntactic foam is readily available from tables. The 3-M Company of Minneapolis, Minnesota markets standard and high strength syntactic foam under the trade designation "Scotch Ply XV241." The standard foam weighs 38 pounds per cubic foot, and for the cubic foot of seawater displaced, a net buoying force of 28 pounds per cubic foot is exerted. Because the uniaxial compressive strength and hydrostatic crush point of this foam exceeds 9,000 pounds per square inch, a cable fashioned to include suitably dimensioned flotation elements for neutral buoyancy remains intact or crushproof at a depth in excess of 18,000 feet. By merely selecting the properly dimensioned flotation elements, the cable's neutral buoyancy is maintained and the cable's weight does not load instrumentation or undersea craft.

Using the high strength syntactic foam of the type identified above allows the fabrication of suitably dimensioned syntactic flotation elements 13 having a density of 44 pounds per cubic foot and a bulk modulus of 450,000 PSI. The net buoying force of a cubic foot of this high strength syntactic foam is 22 pounds per cubic foot in seawater. The higher strength syntactic foam has a higher uniaxial compressive strength of 13,500 pounds per square inch and an even higher hydrostatic crush point, giving an operational depth of greater than 27,000 feet. Thus, a submersible having an inspection vehicle tethered by this cable would experience no appreciable change in buoying or sinking forces between the 0 to 27,000 foot level and reliable, safer operations are ensured.

Figure 2:
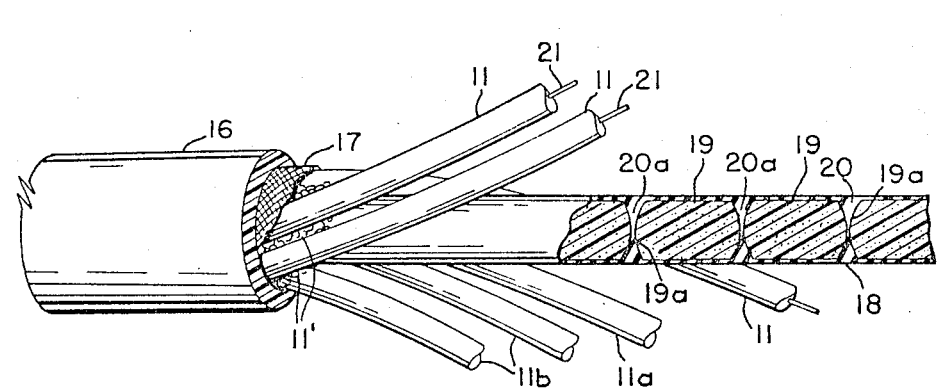
FIG. 2 is a cross-sectional view shown partially in exploded section of a second embodiment of the invention.

An alternate embodiment of the basic concept depicted in FIG. 1 is shown in FIG. 2. Here again, a plurality of insulated electrical conductors 11 and other conduits such as a fiber optic bundle 11a and hydraulic lines 11b and 11c helically wind and run the entire length of the cable. In addition, an outer sheath 16 including, if desired, an interposed wire mesh or foil shielding 17 encloses and protects the cable throughout its length. Plastic filler 11' fills space created as the elements are assembled. In this embodiment, an axially disposed flotation core 18 assures neutral or the desired degree of buoyancy. The core arranges a series of oblong flotation pellets 19 having rounded ends 19a in an elongate flexible member 20. The flexible member is, in one design, an elongate cylinder of silicon rubber in which the adjacent rounded ends 19a of adjacent pellets are separated by a solid portion 20a of molded silicon rubber. Since the oblong flotation pellets are rigid, the solid portions of molded rubber allow flexure of the flotation core giving the cable a capability for storage on a drum and for trailing a tethered vehicle while it is being maneuvered.

The flotation pellets are made of syntactic foam of the sort previously mentioned or they optionally are closed hollow shells of lightweight, high strength material such as glass. Also, for convenience in manufacture and assembly, the pellets may be connected one to another by some type of ligature.

From even a casual inspection of the embodiment of FIG. 2, a need for providing a tensile strength member is apparent. Obviously, tensile strength is not inherent in flotation core 18 for the oblong flotation pellets and the elongate flexible member do not mechanically cooperate to possess impressive tensile strength properties. In this embodiment, merely selecting a slightly different material for the electrical conductors 11 provides the necessary tensile strength capability for most applications. Choosing copper-weld or hand-drawn copper wire conductors 21 simultaneously produces a tensile strength and electrically conductive capabilities to ensure the cable's integrity under most operating conditions. However, when copper wires are chosen as opposed to lighter weight aluminum conductors, additional buoyancy must be provided by the flotation core to offset the added weight.

A weight reduction in flotation core 18 itself is owed to the substitution of polyisoprene rubber or polyethylene in place of the silicon rubber. Since polyisoprene has a specific gravity of 0.93 and polyethylene has a specific gravity of between 0.91 and 0.93 as opposed to a minimum specific gravity of 1.1 for silicon rubber, any sacrifice in flexibility is compensated by the increasing buoying effect of the flotation core.

Helically extending electrical conductors 11 wound about the flotation core do not destroy the preset buoyancy of the cable when heavy tensile loads are borne. The relative noncompressibility of the syntactic foam or glass shell flotation pellets resists deformation even if severe tensile forces are brought to bear.

Figure 3:
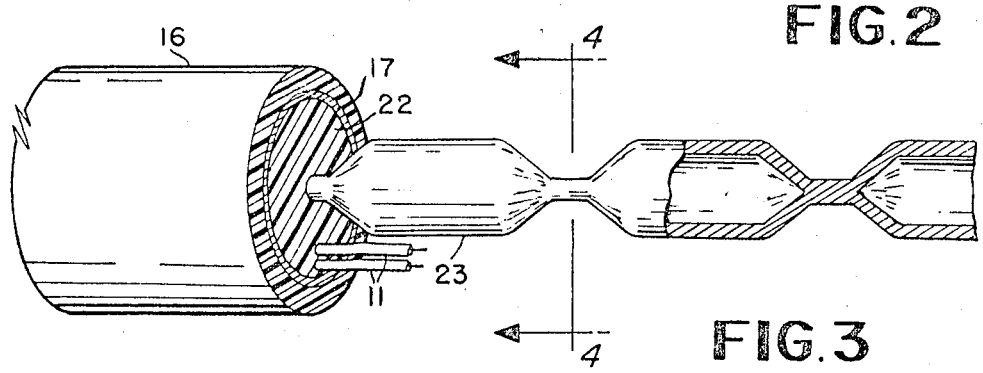
FIG. 3 is an isometric view shown partly in cross section of another embodiment of the invention.

In both the embodiments, the predesigned dimensions of flotation strip 12 or flotation core 18 establish the relative weight of the overall cable. This relative weight is uneffected by changing depths since the materials used to fabricate elements 13 and flotation pellets 19 are relatively incompressible within thier design limits. However, because of the expense of the two designs thusly described, the less expensive configuration depicted in FIG. 3 evolved.

In this design, a rugged sheath 16 of polyvinylchloride encases the entire length of the cable. Optionally, the wire mesh or foil shielding 17 is interposed to guard against the transmission of spurious signals. A nonporous elongate rubber or plastic insulation 22 is disposed inwardly of the shielding to serve the dual function of presenting a streamlined filling for the sheath and to act as a protective buffer for a coaxially disposed flotation tubing 23.

The flotation tubing serves as the threefold purpose of being a means for simultaneously functioning as an electric conductor, the tensile load bearing member, and provides flotation to greatly contribute toward the reduced cost per unit length. The flotation tubing shown in FIGS. 4a and 4b is formed by either of two methods and by these methods of the formation, a series of closed compartments 24 and 25 are separated by interposed closed sections 26 or 27, in FIGS. 4a and 4b respectively.

The method of formation used to define the closed compartments and closed sections calls for swaging the flotation tubing together at predetermined intervals. The compartmented tubing shown in FIG. 4a' and 4a'' is produced with a rotating swage which causes the inner wall of the tubing to be forced inwardly together and a closure is created at an area designated closed section 26. As a consequence of the roll-forming used to close the individual sections to define discrete, closed compartments, the cross-sectional area of the tubing usually is reduced by the swaging action at the closure points. The smaller cross-sectional areas provide higher electrical resistance and are necessarily weaker areas which could fail under tensile loading.

Figure 4A:
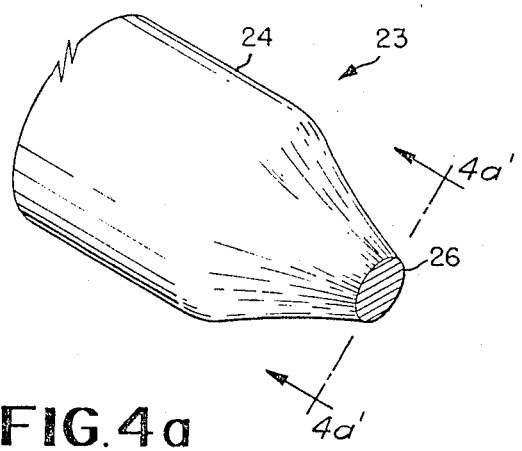
FIG. 4a is an isometric cross-sectional view taken generally along lines 4—4 in FIG. 3 showing one type of the buoyant-compartment end closure.
Figure 4A:
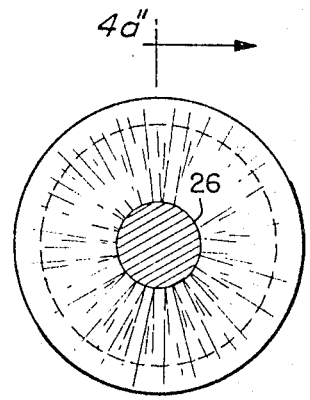
Figure 4B:
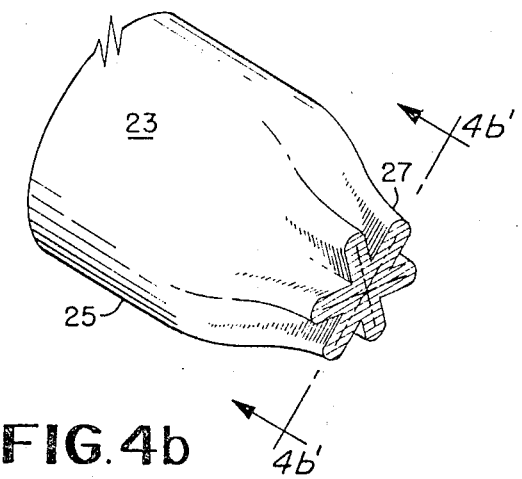
FIG. 4b is another type of buoyant-compartment end closure taken generally along lines 4—4 in FIG. 3.
Figure 4B:
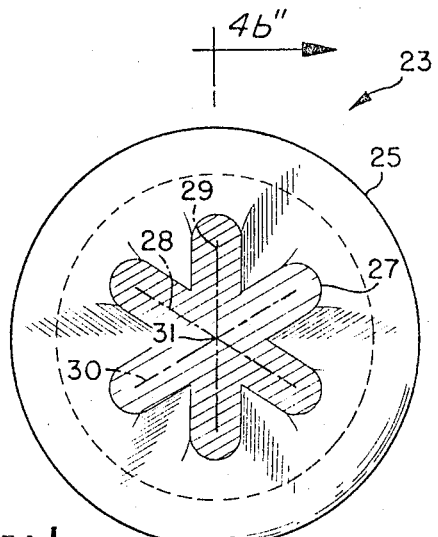

It has been found to be more expedient to create the closed compartments and sections by crimping and pressure welding the flotation tubing as portrayed in FIGS. 4a, 4a', and 4a''. This method ensures relatively constant electrical resistance per unit length and uniform tensile load bearing capacity throughout the length of the flotation tubing by multi-fold axial symmetric crimping and pressure welding the crimped walls together to define closed sections 27. In the representative embodiment depicted in FIGS. 4b et sequence, a crimping tool having six axially symmetric swage bars simultaneously exerts radially inwardly converging forces toward the axis of flotation tubing 23. As the inner wall of the flotation tubing folds against itself, three radially extending surfaces 28, 29, and 30 are forcefully pressed together, see FIG. 4b'. As the crimping tool exerts a greater pressure, the radially disposed surfaces are pressed together more forcefully and the abutting surfaces represented by phantom lines for surfaces 28, 29, and 30 become pressure welded together. Pressure welding of metals, especially identical metals, occurs when intense pressure alone causes the formation of ionic bonds between adjacent molecules of the metal. After a sufficient crimping pressure has been exerted for a predetermined period of time, and perhaps aided by external heat, the pressure welded material at the juncture of the crimped inner walls lying along the radially extending surfaces 28, 29, and 30 becomes integrally fused to possess the same structural identity and characteristics as does a solid piece of material. Because of the intensity of the crimping force, the crimped closed section 27 has a homogeneous, integral composition. A previously defined axis 31 of the flotation tubing similarly is sealed shut throughout the closed sections by the pressure welded interconnection and complete isolation of the serially-arranged closed compartments 25 is ensured. An advantage of using this crimping method is that there is no reduction of the cross-sectional area across the closed sections and, therefore, there is no weakening of the flotation tubing's tensile strength as might be the case when the closed sections are rolled together as disclosed above. While the rotary swaging process tended to extrude or stretch the dimensions of the closed sections, the crimping approach maintains the cross-sectional area across the closed section substantially identical with the cross-sectional area across the closed compartments. A flotation tubing fashioned in accordance with respect to the latter disclosed method affords an acceptable degree of flexure or bending across the closed sections 27. The crimping or crimping-swaging operation may be mechanical or thermomechanical process but a more advanced procedure employs a magneto-swaging technique.

A representative embodiment of a neutrally buoyant cable fabricated to include a flotation tubing 23 employed a soft round drawn aluminum tube marketed under the commercial designation "Alcoa Alloy 5050-0." With this particular type tubing it was found that sealed lengths of unmodified tubing float when the ratio of the outer diameter to the wall thickness is approximately 9.7:1. Neutral buoyancy for a sample of compartmented tubing was achieved when the ratio of the outer diameter to the wall thickness of the unmodified tubing equaled 11.9:1. In practice, however, neutral buoyancy in the tubing alone is not always achieved or desired, and smaller outer diameter to thickness ratios are often used. For example, a ratio of only 5:1 was utilized in one compartmented aluminum tubing conductor. Here the dimensions were 0.125 inch outside diameter by 0.025 inch thick wall. With these dimensions, the length of a sloping shoulder 32 reaching between a closed compartment 25 and a closed section 27 typically had a longitudinal length equal to the tubing's outer diameter divided by two. A closed compartment having an overall length from the midpoint of one closed section 27 to the next closed section 27 spanned a distance equal to five times the outer diameter of the tubing. Fashioned in this manner, the 0.125 outer diameter tubing fails in compression only after it is subjected to pressures in excess of 3,200 pounds per square inch. If this alloy is brought to a half-hard condition, a collapse pressure of 9,600 pounds per square inch is attained. Thus, even the more flexible annealed tubing having the 3,200 pound per square inch collapse pressure retains its structural integrity at depths in excess of 6,400 feet.

Because there is substantially no reduction in the cross-sectional area across each of the crimped closed sections 27, the cross-sectional area throughout the length of the flotation tubing is constant. The material of the aluminum tubing referred to above, the Alcoa Alloy 5050-0 material, has a work-hardening, tensile-strength-lowering when the tensile forces exerted across it exceed $21 \times 10^3$ pound per square inch. The 0.125 inch outer diameter aluminum tubing used in our example has a cross-sectional area sufficient to provide a 165 pound tensile strength before work hardening begins. Therefore, even the small diameter aluminum used in the instant example has more than sufficient strength for serving as the structural member reaching between a submersible and a small tethered vehicle. In addition, the highly satisfactory, electrically conductive properties of the aluminum tubing are advantageously exploited in this design. Larger diametered or thicker walled tubings as well as multi-conductor cables utilizing such compartmented tubing are adaptable for being the tensile load bearing member under more adverse conditions.

In all adaptations where the constant-buoyancy advantages of relatively high-displacement compartmented tubing 23 is employed, it is necessary to provide a void-free conformal rubber or plastic insulation 22 of uniform outer shape which electrically insulates the tubing. Selecting polyethylene or polyisoprene as the insulation 22 allows sufficient flexibility, protects the electrical signal carrying flotation tubing 23, and meets the conventional requirements for good cable design. Because of its relatively low specific gravity of 0.91 to 0.93 additional buoyancy is provided. Also, multiple, but electrically isolated, conductors 11 are laminated or molded into the plastic insulation should the need arise. Outer sheath 16 and shielding 17 are optional.

In all of the disclosed embodiments neutral buoyancy is ensured by the routine sizing and location of discrete flotation elements not influenced by changing ambient pressures. Since there is no common fluid connection between adjacent elements or compartments, should one of them become damaged, it is that one and that one alone that is flooded or rendered unserviceable.

Figure 5:
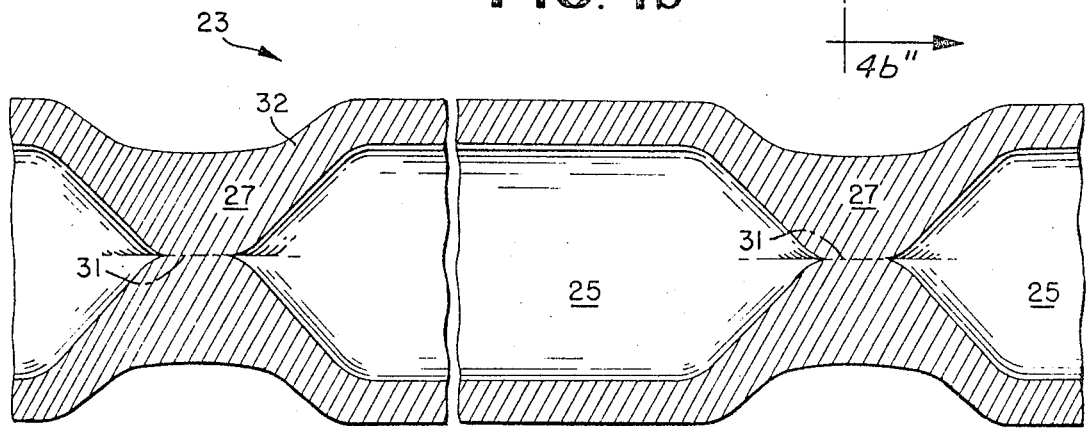
FIG. 5 is yet another embodiment of the invention.
Figure 5:
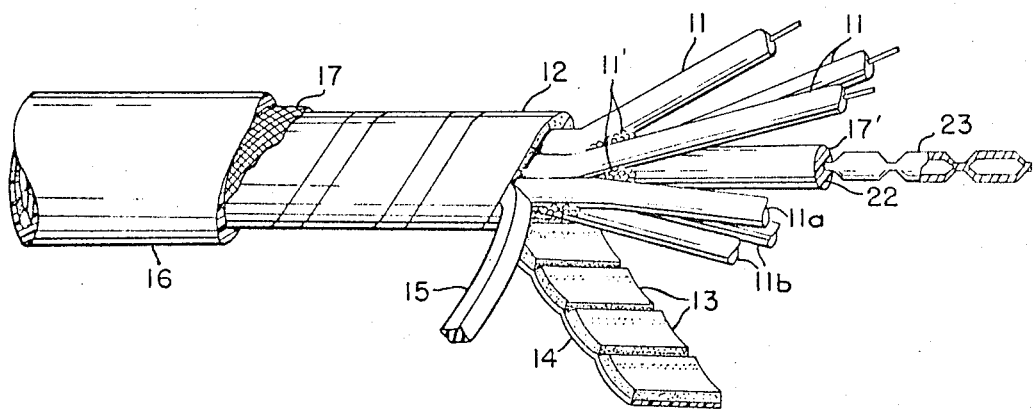

A hybrid design is shown in FIG. 5. In this design, a flotation tubing 23 is substituted in place of wire or fiber glass rope 10 of the embodiment of FIG. 1. The flotation tubing will assist the helically mounted flotation strip 12 in providing buoyancy and will also provide an additional channel for power or data. Functioning in conjunction with a shielding 17' the flotation tubing also introduces a coaxial cable capability with no sacrifice in complexity.

Another combination of flotation elements shown in FIG. 5 modifies the embodiment shown in FIG. 2. In this modification the buoying capacity of flotation core 18 is augmented by a juxtaposed flotation tubing 23. Here again, the flotation tubing provides buoyancy and an additional channel for power or data.

Figure 6:
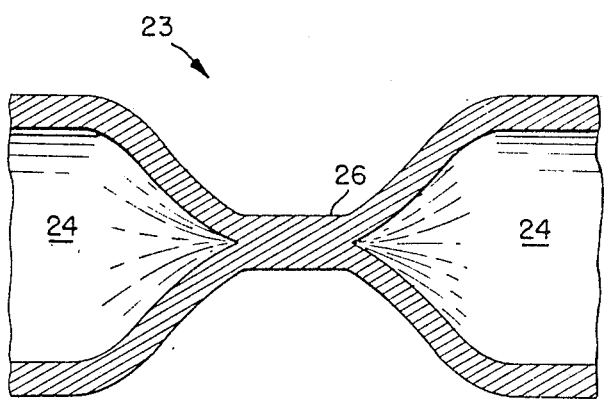
FIG. 6 is still another embodiment of the invention.
Figure 6:
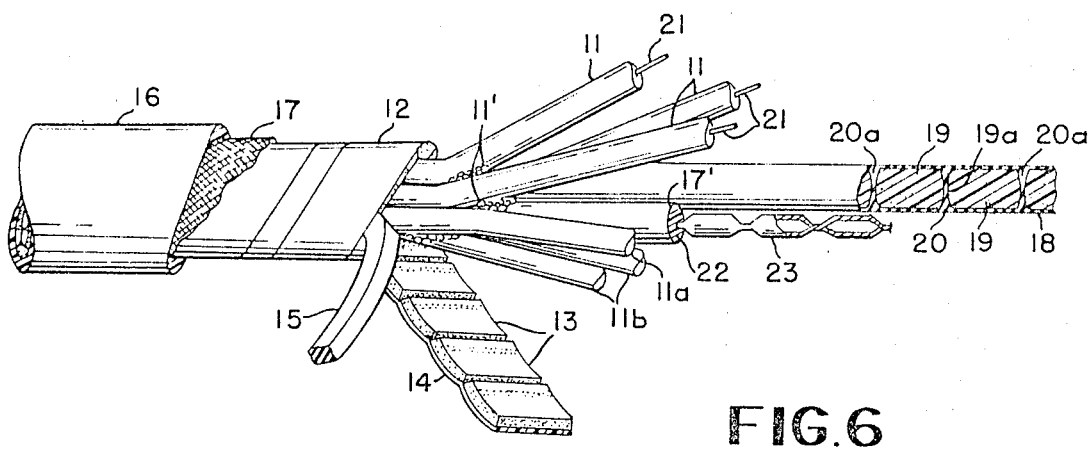

Both the flotation core and the flotation tubing could be added in either modification depicted in FIGS. 5 or 6 should the need arise. With the foregoing teachings in mind, any combination of electrical cables, fiber optic bundles, hydraulic lines, flotation strips, cores or tubing is foreseeable and the desired degree of buoyancy is achieved by the proper selection of elements. Fabrication of a cable as herein disclosed provides a rugged, flexible marine cable relatively unaffected by ambient pressures.

Obviously, many modifications and variations of the present invention are possible in the light of the above teachings, and, it is therefore understood that within the scope of the disclosed inventive concept, the invention may be practiced otherwise than specifically described.

What is claimed is:

1. A cable for marine applications comprising:
   means for providing continuous tensile strength having a flexibility to allow use of reels and curved storage and for additionally providing an electrical conductor;
   means encasing the providing means disposed on said providing means for electrically insulating, waterproofing and mechanically protecting it for ease in handling and satisfactory hydrodynamic characteristics; and
   means defining a plurality of discrete buoyant sections longitudinally spaced within the encasing means and co-axially disposed about the providing means protecting it from external damage, said buoyant sections are syntactic foam elements particularly sized to ensure neutral buoyancy in water of a stated specific gravity and fabricated for being relatively non-deformable by changing ambient pressures and a compliant strip is interposed between said buoyant sections to allow flexibility.

2. A cable according to claim 1 in which said buoyant sections are mounted on a backing strip prior to cable assembly.

3. A cable according to claim 2 in which said compliant strip is optionally mounted on said backing strip.

4. A cable according to claim 1 in which said providing means includes a wire rope enabling said continuous tensile strength and insulated wires functioning as said electrical conduit.

5. A cable according to claim 1 in which said providing means includes an elongate electrically conducting tubing having sequential closures at regular intervals to further define said discrete buoyant sections and said encasing means includes electrical shielding cooperating with said elongate tubing to form a coaxial cable.

6. A cable for marine applications comprising:
   means for providing continuous tensile strength having a flexibility to allow use of reels and curved storage and for additionally providing an electrical conductor;
   means encasing the providing means disposed on said providing means for electrically insulating, waterproofing and mechanically protecting it for ease in handling and satisfactory hydrodynamic characteristics; and
   means defining a plurality of discrete buoyant sections longitudinally spaced within the encasing means, particularly sized to ensure neutral buoyancy in water of a stated specific gravity, and fabricated for being relatively nondeformable by changing ambient pressures, said buoyant sections are syntactic foam elements arranged in series and a nonporous bonding agent flexibly joins sequential ones of the buoyant section together to further ensure flexibility.

7. A cable according to claim 1 in which at least some of said buoyant sections are syntactic foam elements arranged in series and a nonporous bonding agent flexibly joins sequential ones of the buoyant sections together to further ensure said flexibility.

8. A cable for marine applications comprising:
   means for providing continuous tensile strength having a flexibility to allow use of reels and curved storage and for additionally providing an electrical conductor;
   means encasing the providing means disposed on said providing means for electrically insulating, waterproofing and mechanically protecting it for ease in handling and satisfactory hydrodynamic characteristics; and
   means defining a plurality of discrete buoyant sections longitudinally spaced within the encasing means, particularly sized to ensure neutral buoyancy in water of a stated specific gravity, and fabricated for being relatively nondeformable by changing ambient pressures, at least some of said buoyant sections are hollow, pressure-proof flotation elements arranged in series and a nonporous bonding agent flexibly joins sequential ones of the buoyant sections together to further ensure flexibility.

9. A cable according to claim 1 in which at least some of said buoyant sections are hollow, pressure-proof flotation elements arranged in series and a nonporous bonding agent flexibly joins sequential ones of the buoyant sections together to further ensure said flexibility.

10. A cable according to claim 6 in which said providing means is at least one wire laid adjacent said elements.

11. A cable according to claim 8 in which said providing means is at least one wire laid adjacent said elements.

12. A cable for marine applications comprising:
    means for providing continuous tensile strength having a flexibility to allow use of reels and curved storage and for additionally providing an electrical conductor;
    means encasing the providing means disposed on said providing means for electrically insulating, waterproofing and mechanically protecting it for ease in handling and satisfactory hydrodynamic characteristics; and
    means defining a plurality of discrete buoyant sections longitudinally spaced within the encasing means, particularly sized to ensure neutral buoyancy in water of a stated specific gravity, and fabricated for being relatively nondeformable by changing ambient pressures, said providing means is at least partially provided by an elongate electrically-conducting tubing formed iwth spun-closed sequential sections spaced at regular intervals to define a series of bending points ensuring flexibility and to define said discrete buoyant sections ensuring predetermined buoyancy.

13. A cable according to claim 12 in which the cross-sectional area of said closure sections is less than the cross-sectional area of said elongate tubing where it encloses said buoyant sections.

14. A cable for marine applications comprising:
    means for providing continuous tensile strength having a flexibility to allow use of reels and curved storage and for additionally providing an electrical conductor;
    means encasing the providing means disposed on said providing means for electrically insulating, waterproofing and mechanically protecting it for ease in handling and satisfactory hydrodynamic characteristics; and
    means defining a plurality of discrete buoyant sections longitudinally spaced within the encasing means, particularly sized to ensure neutral buoyancy in water of a stated specific gravity, and fabricated for being relatively nondeformable by changing ambient pressures, said providing means is an elongate electrically conducting tubing formed with crimped, pressure welded closure sections at regular intervals to define a series of bending points ensuring flexibility and to define said discrete buoyant sections ensuring predetermined buoyancy.

15. A cable according to claim 14 in which the cross-sectional area of said closure sections is substantially equal to the cross-sectional area of said elongate tubing where it encloses said buoyant sections to ensure constant tensile strength and uniform electrical resistivity throughout the length of said cable.

16. A cable according to claim 15 that includes at least one fiber-optic bundle.

17. A cable for marine applications comprising:
means for providing continuous tensile strength having a flexibility to allow use of reels and curved storage and for additionally providing an electrical conductor;
means encasing the providing means disposed on said providing means for electrically insulating, waterproofing and mechanically protecting it for ease in handling and satisfactory hydrodynamic characteristics; and
means defining a plurality of discrete buoyant sections longitudinally spaced within the encasing means, particularly sized to ensure neutral buoyancy in water of a stated specific gravity, and fabricated for being relatively nondeformable by changing ambient pressures, said buoyant sections include at least one flotation strip of syntactic foam flotation elements, at least one flotation core of oblong syntactic foam flotation pellets, and at least one flotation tubing having spun closed compartments for providing the desired electrical, mechanical and buoyancy characteristics.

18. A cable for marine applications comprising:
means for providing continuous tensile strength having a flexibility to allow use of reels and curved storage and for additionally providing an electrical conductor;
means encasing the providing means disposed on said providing means for electrically insulating, waterproofing and mechanically protecting it for ease in handling and satisfactory hydrodynamic characteristics; and
means defining a plurality of discrete buoyant sections longitudinally spaced within the encasing means, particularly sized to ensure neutral buoyancy in water of a stated specific gravity, and fabricated for being relatively nondeformable by changing ambient pressures, said buoyant sections include at least one flotation strip of syntactic foam elements, at least one flotation core of hollow pressure-proof elements flexibly joined by a nonporous bonding agent, and at least one flotation tubing having crimped, pressure welded sections defining a series of closed compartments for providing the desired electrical, mechanical, and buoyancy characteristics.

19. A cable according to claim 1 further including:
a plastic filler disposed within said encasing means to fill spaces not occupied by said providing means and said buoyant sections for ensuring said neutral buoyancy irrespective of changing ambient pressures.

* * * * *